(12) United States Patent
Pontillo (10) Patent No.: US 7,909,128 B1
(45) Date of Patent: Mar. 22, 2011

(54) SAFETY APPARATUS FOR AUTOMOBILE

(76) Inventor: Giuseppe Pontillo, Kerry (IE)

( * ) Notice: Subject to any disclaimer, the term of this patent is extended or adjusted under 35 U.S.C. 154(b) by 71 days.

(21) Appl. No.: 12/340,728

(22) Filed: Dec. 21, 2008

(51) Int. Cl.
*B60K 28/02* (2006.01)

(52) U.S. Cl. ......... 180/272; 180/270; 340/439; 340/576

(58) Field of Classification Search ............. 180/270, 180/272, 273; 340/439, 576
See application file for complete search history.

(56) References Cited

U.S. PATENT DOCUMENTS

| | | | |
|---|---|---|---|
| 3,787,804 A * | 1/1974 | MacDonald | 180/268 |
| 3,912,939 A * | 10/1975 | Quantz et al. | 340/573.1 |
| 4,477,874 A * | 10/1984 | Ikuta et al. | 701/49 |
| 7,199,703 B2 * | 4/2007 | Okita et al. | 340/457.1 |
| 2005/0099310 A1 * | 5/2005 | Jones | 340/576 |
| 2009/0146846 A1 * | 6/2009 | Grossman | 340/988 |

* cited by examiner

*Primary Examiner* — Paul N Dickson
*Assistant Examiner* — Timothy D Wilhelm (57) ABSTRACT

A safety apparatus for an automobile includes a control unit, which is connected to an ignition system of an automobile, a seat belt sensor, which is connected to the control unit, and a seat occupancy detector, which is connected to the seat belt sensor. In the event that it senses an occupant in an automobile seat, the seat occupancy sensor transmits a signal to the seat belt sensor. In the event that it senses that the seat belt of the seat is fastened, the seat belt sensor transmits an activation signal to the control unit, which enables operation of the ignition system. In the event that it senses that the seat belt of the seat is not fastened, the seat belt sensor transmits an inactivation signal to the control unit, which does not enable operation of the ignition system.

4 Claims, 7 Drawing Sheets

SAFETY APPARATUS FOR AUTOMOBILE

FIELD OF THE INVENTION

The present invention relates to a safety apparatus for an automobile. In particular, it relates to an apparatus for compelling seat belt usage by the occupants of an automobile.

Although seat belts are provided in all automobiles these days, many people do not fasten their seat belts when traveling. The failure to fasten seat belts on the part of the occupants greatly increases the risk of sustaining a serious injury, even fatal, if involved in a road accident. Many safety campaigns focus on trying to increase the seat belt usage by occupants in automobiles, both in the front seat and the back seat. However, it is well known that many people still do not comply with seat belt wearing requirements, thereby putting themselves and others at great risk.

It is an object of the invention to provide a safety apparatus for an automobile, which mitigates the problems associated with the lack of seat belt usage by the occupants of automobiles.

According to the present invention, there is provided a safety apparatus for an automobile, the apparatus comprising at least one seat belt and a seat belt clasp; a sensor for detecting when the seat belt is engaged with the clasp; and a control unit operable to cause the automobile to function in a first mode when the sensor detects that the seat belt is in a first state, and in a second mode when the sensor detects that the seat belt is in a second state.

Preferably, the apparatus comprises at least one detector for detecting when a seat in the automobile is occupied.

Further preferably, the detector co-operates with the sensor so that, when the detector detects that the seat is occupied, the sensor is actuated to detect if the seat belt is in the first or second state.

Preferably, the control unit communicates with an ignition system of the automobile such that when the automobile is functioning in the first mode, the ignition system prevents the automobile from starting; and when the automobile is functioning in the second mode, the ignition system enables the automobile to be started.

SUMMARY OF THE INVENTION

The disclosure is generally directed to a safety apparatus for an automobile. An illustrative embodiment of the safety apparatus includes a control unit, which is connected to an ignition system of an automobile, a seat belt sensor which is connected to the control unit and a seat occupancy detector which is connected to the seat belt sensor. In the event that it senses an occupant in an automobile seat, the seat occupancy sensor transmits a signal to the seat belt sensor. In the event that it senses that the seat belt of the seat is fastened, the seat belt sensor transmits an activation signal to the control unit, which enables operation of the ignition system. In the event that it senses that the seat belt of the seat is not fastened, the seat belt sensor transmits an inactivation signal to the control unit, which does not enable operation of the ignition system.

DETAILED DESCRIPTION OF THE PREFERRED EMBODIMENT

Figure 1:
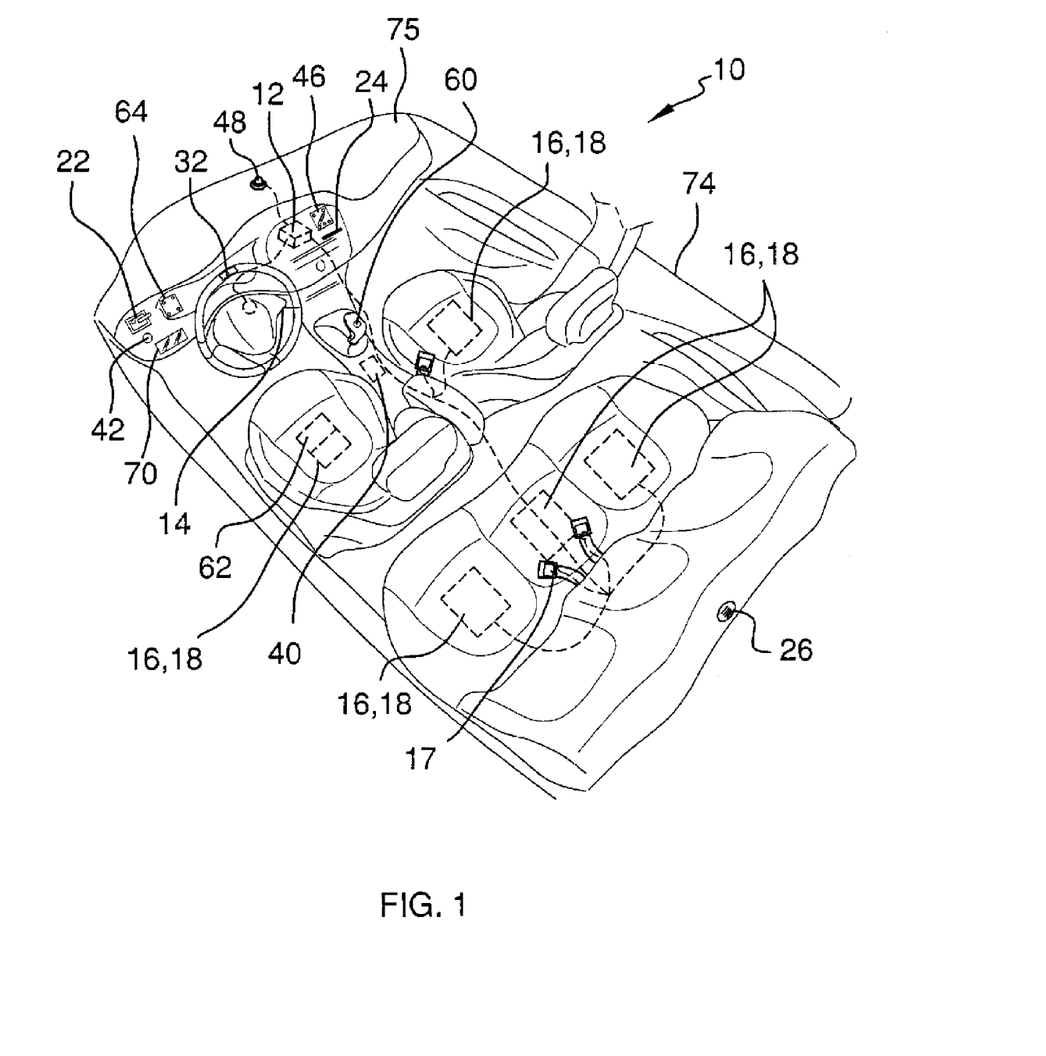
FIG. 1 is a perspective view, partially in section, of an interior of an automobile, with an illustrative embodiment of the safety apparatus installed in the automobile.
Figure 2:
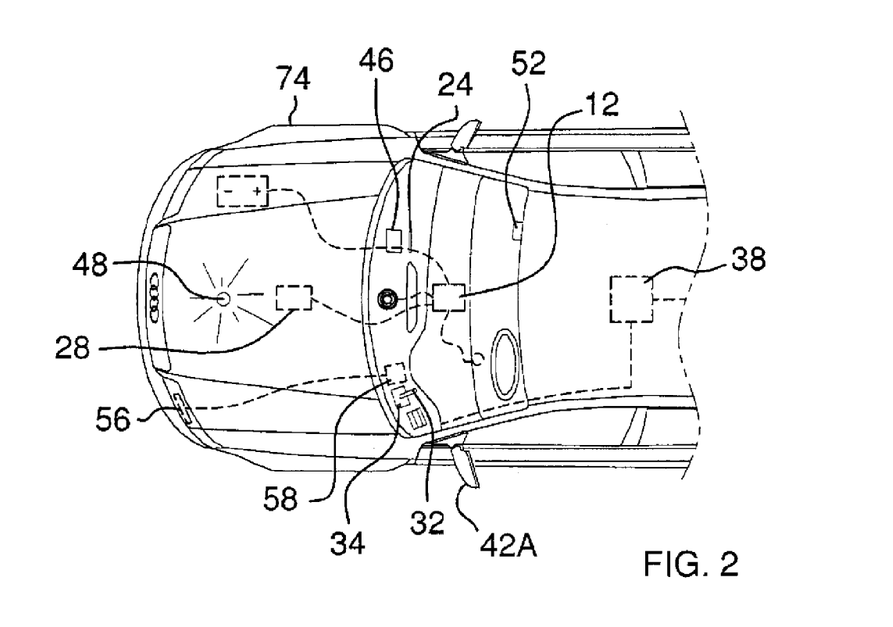
FIG. 2 is a top view of an automobile, partially in section, more particularly illustrating a card-actuated automobile immobilization embodiment of the safety apparatus.
Figure 3:
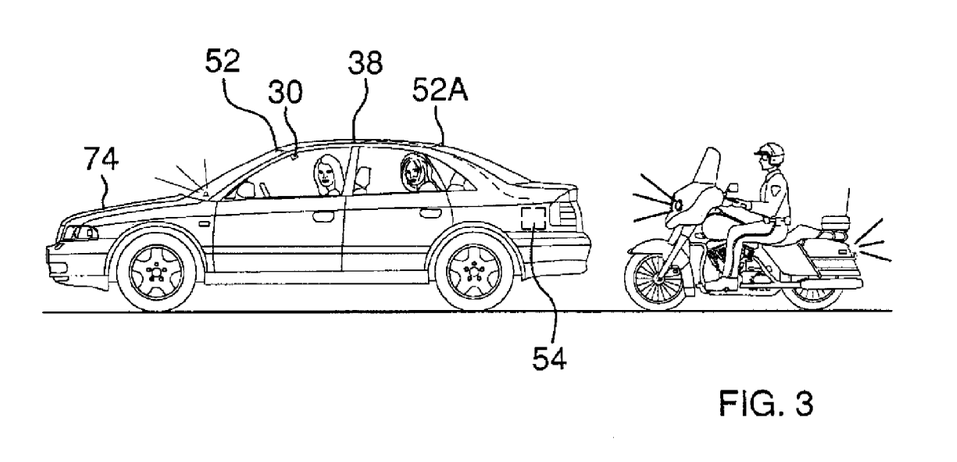
FIG. 3 is a side view of an automobile in which an illustrative embodiment of the safety apparatus is installed, more particularly illustrating illumination of a light emitter indicating a fastened state of all seatbelts in the automobile in operation of the safety apparatus.

Referring initially to FIGS. 1-3 of the drawings, there is illustrated a safety apparatus 10 for an automobile 74. The apparatus 10 is designed to prevent the automobile 74 from starting when any occupant (not shown) of the automobile 74 has not fastened his/her seat belt (not shown), as will be explained herein below.

The schematic layout of FIG. 1 illustrates the potential occupancy of the automobile 74. For purposes of illustration only, FIG. 1 shows five seat occupancy detectors 16 and five seat belt sensors 18. The three right-hand detector/sensor arrangements 16, 18 in FIG. 1 corresponds to the three back seats in a conventional automobile 74, whereas the remaining two left-hand detector/sensor arrangements 16, 18 correspond to the front passenger seat and the driver seat, respectively, of the automobile 74.

As shown in FIG. 1, the safety apparatus 10 includes a control unit 12 which may be provided in any suitable location in the automobile 74, such as in the dashboard 75 thereof, for example and without limitation. The seat occupancy detector 16 is electrically connected to the seat belt sensor 18 of each detector/sensor arrangement 16, 18. The seat belt sensor 18, in turn, is electrically connected to the control unit 12. The seat belt sensor 18 is also connected to the seat belt fastening mechanism (not shown) of each corresponding seat belt (not shown) in the automobile 74 and is capable of determining whether the seat belt is in a fastened or an unfastened state, according to the knowledge of those skilled in the art.

In use, the seat occupancy detector 16 of each detector/sensor arrangement 16, 18 is operable to detect whether or not each corresponding seat in the automobile 74 is occupied. The safety apparatus 10 shall now be described with respect to one of the detector/sensor arrangements, 16, 18 which is labeled 17 in FIG. 1. In the event that the seat occupancy detector 16 does not detect an occupant (not shown) sitting in the seat, the seat occupancy detector 16 does not send a signal to the associated seat belt sensor 18. However, in the event that it does detect that an occupant is sitting in the seat, the seat occupancy detector 16 sends a signal to the associated seat belt sensor 18, thereby actuating the seat belt sensor 18.

Once actuated, the seat belt sensor 18 detects whether or not the respective seat belt fastening mechanism of the seat belt is engaged. When the seat belt (not shown) is in an unfastened state, the seat belt sensor 18 communicates a "no" signal to the control unit 12, indicating that the seat belt is not fastened. The control unit 12 accordingly causes the automobile 74 to function in a first mode in which the automobile will not start. When the seat belt is in a fastened state, the sensor 18 communicates a "yes" signal to the control unit 12, indicating that the seat belt is fastened.

In the event that the seat belt sensors 18 of all of the occupied seats in the automobile 74 generate a "yes" signal, the control unit 12 causes the automobile 74 to function in the second mode, thus enabling the automobile 74 to be started. In this manner, the seat occupancy detectors 16 and associated seat belt sensors 18 enable the seat belt usage of the occupants to affect whether or not the automobile 74 will start. Thus, the safety of the occupants is enhanced by the apparatus 10.

Turning now to each of the components of the safety apparatus 10 in turn, the control unit 12 preferably comprises a microprocessor or the like. As shown in FIG. 1, the control unit 12 preferably communicates with an ignition system 14 of the automobile 74 to enable the control unit 12 to cause the automobile 74 to function in the first (non-start) mode or the second (start) mode.

Each of the seat occupancy detectors 16 preferably comprises a detecting device (not shown) which is actuated once it detects a certain weight, according to the knowledge of those skilled in the art. Each of the seat occupancy detectors 16 is therefore preferably located either within or just below the corresponding seat of the automobile 74. Each seat belt sensor 18 may comprise any suitable type of conventional indicator, which would serve to indicate that the seat belt is fastened by means of engagement of the seat belt fastening mechanism.

As further shown in FIG. 1, the safety apparatus 10 may also comprise a light emitter 22 which is connected to the control unit 12. The light emitter 22 may serve to either alert the driver to the fact that not all the seat belts are fastened, or, alternatively, it may be positioned on the dash board 75 to notify a to a police officer outside the automobile 74 that all the seat belts are actually fastened.

The safety apparatus 10 may also be constructed and adapted to deal with a situation in which an occupant unfastens his or her seat belt when the automobile 74 is in motion. An alarm 26 is provided which is designed to produce a "beeping" sound once the respective seat belt sensor 18 detects that the seat belt has been unfastened. This alarm 26 may be designed to produce a low-level sound which increases over time. If the seat belt is not re-fastened within a set time period (for example 90 seconds), the control unit 12 will have an effect on a fuel injection system 28 (FIG. 2) of the automobile 74. For example, the quantity of air supplied to the fuel injection system 28 may be reduced which, in turn, reduces the quantity of fuel supplied to the engine (not shown) of the automobile 74. In this manner, the automobile 74 will slowly reduce in speed until the seat belt in question is re-fastened. It will be apparent that this mechanism (which is based on the operation of a conventional cruise control system), may be adapted in any way, and that any other suitable mechanism may be used.

It will be apparent that the apparatus 10 is not limited to the embodiment described herein. For example, as shown in FIG. 2, the apparatus 10 may further comprise an anti-theft device slot 24 which is also connected to the control unit 12. A magnetic coded slot card (not shown), for example, would be positioned with the slot 24 when the automobile 74 is in motion. When the automobile 74 is parked, the slot card would be removed from the slot 24. This would have the same effect as if a "no" signal were sent from a seat belt sensor 18 to the control unit 12, i.e., the automobile 74 would not start. In order to start the automobile 74, the slot card would need to be re-inserted in the slot 24. In this way, the slot 24, and slot card would provide the apparatus 10 with a further security feature.

It will be appreciated that the various positions and configurations of the components of the safety apparatus 10 are not limited to those shown in the Figures. The lines connecting various components are used to merely indicate that the various components communicate with other components of the apparatus—a skilled person would appreciate that the present invention provides a wide variety of possible arrangements, while still falling within the scope of the invention.

It will be apparent that the number and nature of sensors 18, detectors 16, switches, control units 12 and the like, may be adapted to suit different situations and vehicles. It will also be apparent that although the preferred embodiment discloses a first mode wherein the automobile 74 is prevented from starting and a second mode wherein the automobile 74 can start, the safety apparatus 10 may be adapted such that the first mode permits a minimum automobile speed or engine output and the second mode permits maximum vehicle speed or engine output.

Figure 4:
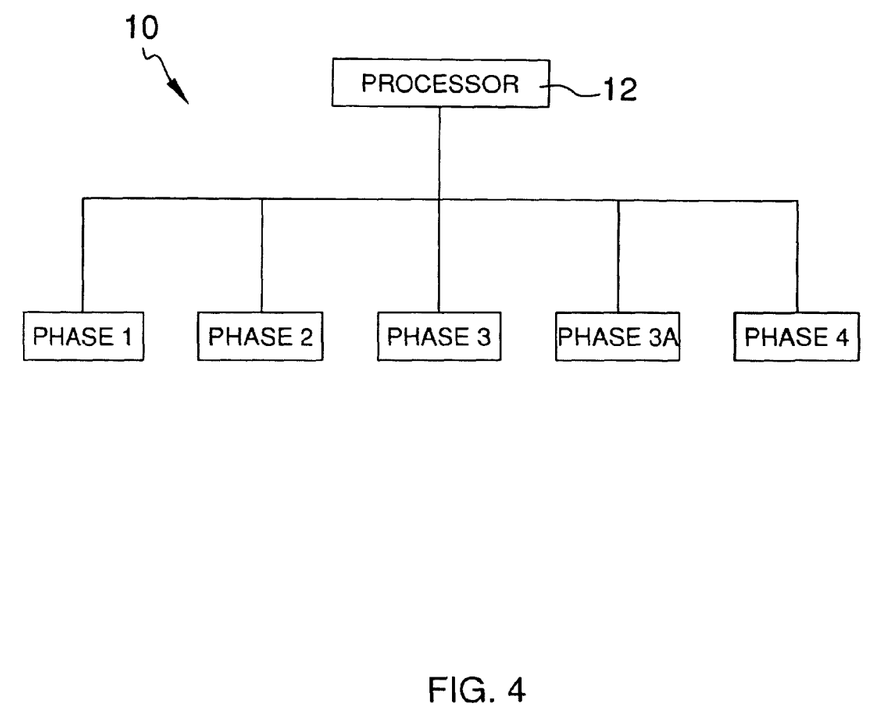
FIG. 4 is a schematic diagram illustrating implementation of various phases of an illustrative embodiment of the safety apparatus.
Figure 5:
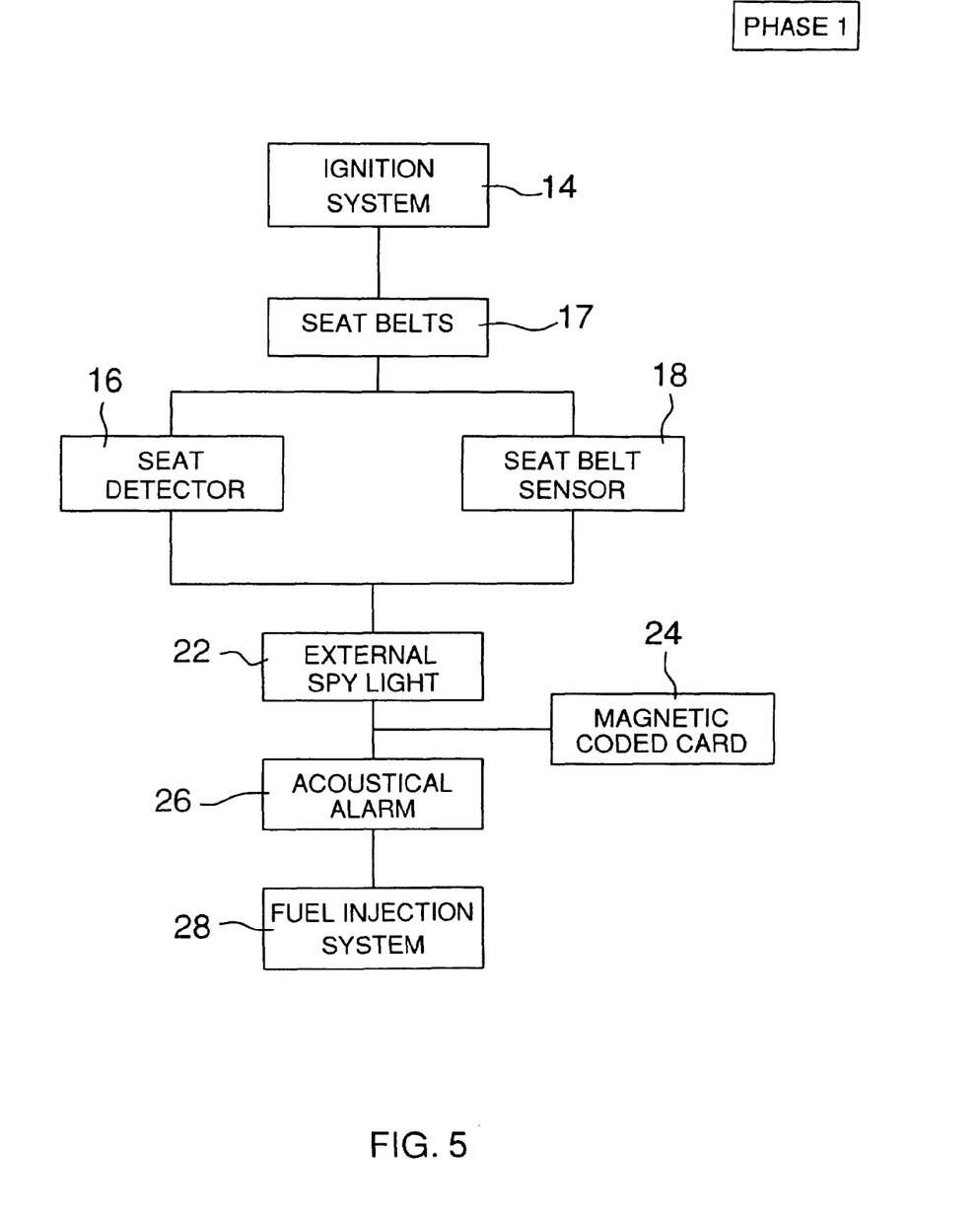
FIG. 5 is a schematic diagram illustrating implementation of a first phase of an illustrative embodiment of the safety apparatus.

Referring next to FIGS. 4-9, the control unit 12 may be adapted to operate the safety apparatus 10 in multiple phases which are designated phase 1, phase 2, phase 3, phase 3A and phase 4 in FIG. 4. As shown in FIG. 5, in phase 1, responsive to the input from each detector/sensor arrangement 16, 18, the control unit 12 operates the ignition system 14 in the first (non-start) mode or the second (start) mode depending on whether the occupants are wearing their seat belts. The control unit 12 may additionally illuminate the light emitter 22 that the occupants of the automobile 74 are wearing their seat belts. This may indicate to a police officer, for example, that the seat belts are fastened in the event that the automobile 74 is pulled over, as shown in FIG. 3. The anti-theft device slot 24; the alarm 26; and the fuel injection system 28 may additionally interface with the control unit 12 in the manner which was heretofore described with respect to FIGS. 1 and 2.

Figure 6:
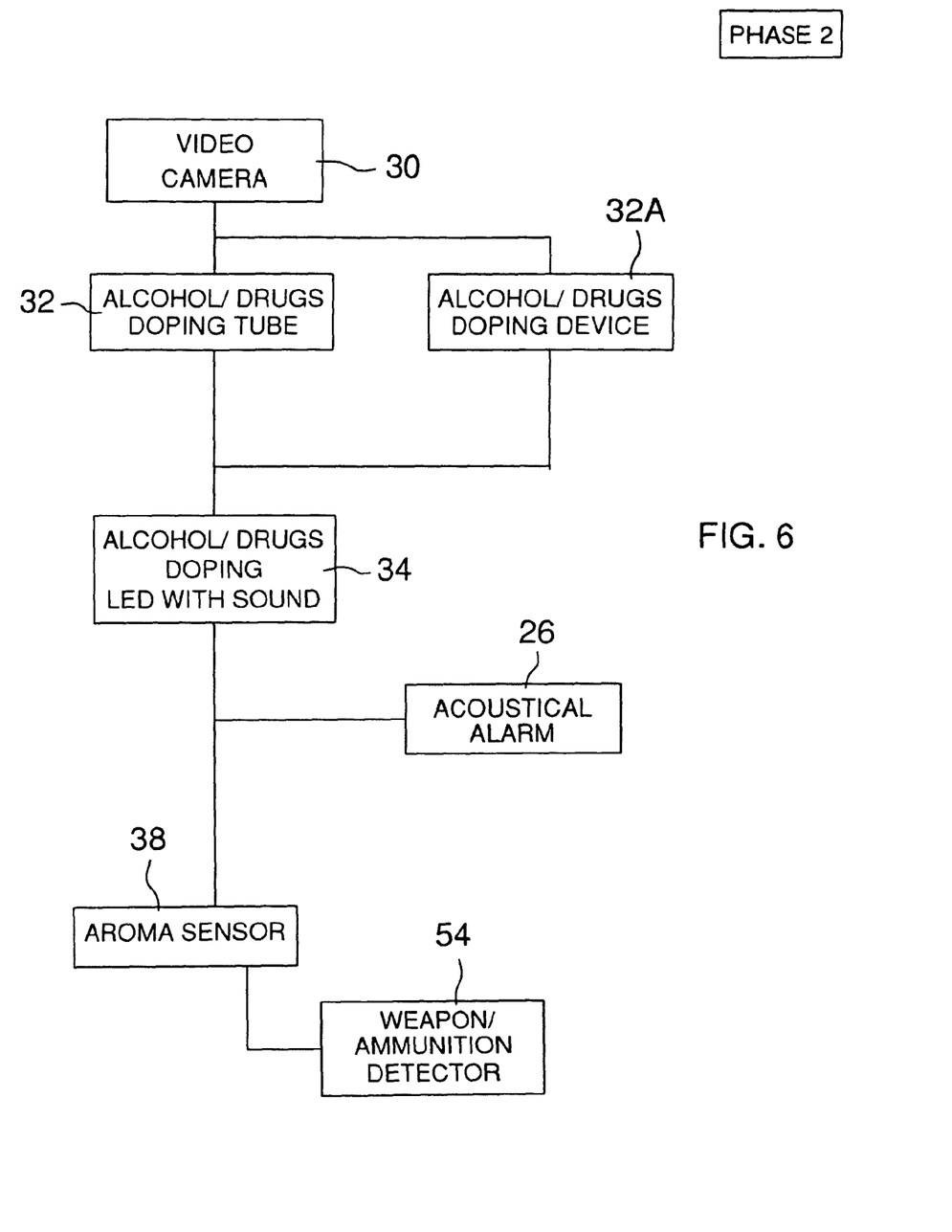
FIG. 6 is a schematic diagram illustrating implementation of a second phase of an illustrative embodiment of the safety apparatus.

As shown in FIG. 6, in phase 2, the control unit 12 (not shown in FIG. 6) will have a video camera 30, permanently installed, inside the vehicle which will register and store the driver's image, so that only the driver will have to perform the required tests. Having satisfied phase 1 conditions, an alcohol/drugs doping led with a beep sound 34 will indicate to the driver to carry out the test. The driver will now pull a tube 32 connected to the doping device 32A out from the dash board 75 (not shown in FIG. 6) into which he/she will have to blow his/her breath. The tube 32 is covered by a hygienic plastic mouthpiece, which will be changed for each use. The doping device 32A will measure and register the alcoholic level of the driver. The doping device 32A consists of a measuring scale, which illuminates the result on the dash board 75 and at the same time sends a positive or negative message to the control unit 12 depending on whether the result is within or outside the legal limit. As a result, as in the case of the seat belts, the control unit 12 will cause the automobile 74 (not shown in FIG. 6) to function in the first (non-start) mode or the second (start) mode.

This device will also prevent the driver and passengers from drinking alcohol while driving. If anyone brings any drink to their mouth an aroma sensor 38 will establish the presence or otherwise of alcohol. In this case just as in the case of the seatbelts the control unit 12 will activate the acoustical sound 26 which will start to operate at low level and gradually will increase in volume up to the maximum decibel level which is innocuous yet disturbingly loud. This deterrent will force the driver to stop the car and to repeat the whole operation in order to set out again as the control unit 12 will have an effect on the fuel injection system 28 of the automobile 74, slowing down the speed as indicated in phase 1.

The device 32A would also recognize narcotic drugs consumed by the driver. The mouthpiece attached to the tube 32 to measure the alcohol level would be covered by treated paper, which would have to be wet by the driver's saliva. The device 32A will analyze the reaction of the saliva on the substances pre-placed in the treated paper to identify the eventual presence of drugs. Obviously the device 32A is composed of two scales one for the alcohol and the other one for the drugs. All the operations for the departure of the vehicle as outlined in the case of the alcohol measurer would ensue.

When the automobile engine is switched off and the seat belt 16 (not shown in FIG. 6) is released all the values, which have been memorized, will be annulled and so the alcohol/drugs device 32A and the video camera 30 will be ready for the next departure.

Figure 7:
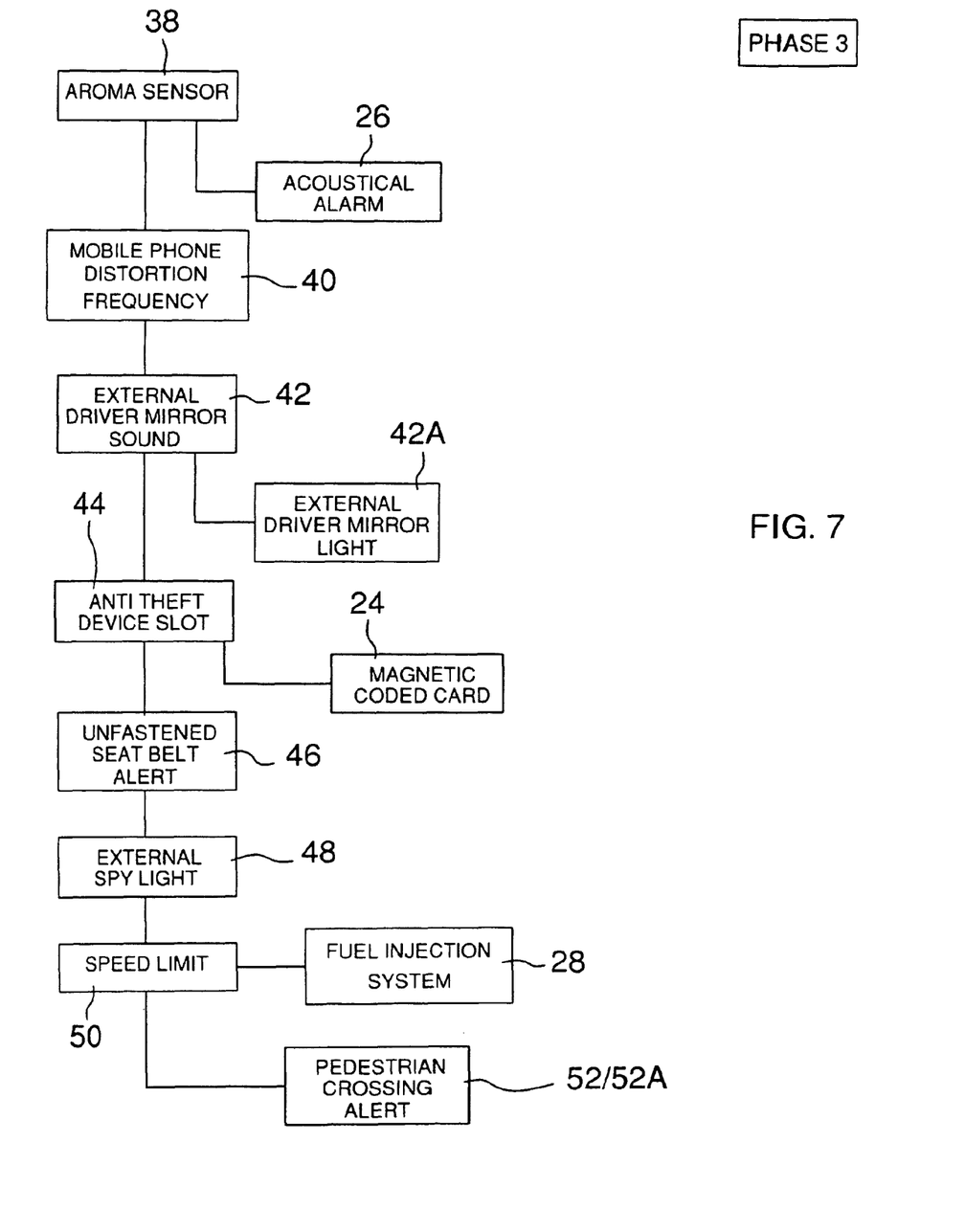
FIG. 7 is a schematic diagram illustrating implementation of a third phase of an illustrative embodiment of the safety apparatus.

As shown in FIG. 7 in phase 3 the control unit 12 (not shown in FIG. 7) may interface with an aroma sensor 38 installed in the center of the roof which will detect any smell related to alcohol, any smoke emanating either from cigarettes or cannabis as well as the smell of ammunition so that guns and ammunition cannot be carried in the car. On detection of any of these by the aroma sensor 38, the acoustical sound 26 will be activated by the control unit 12. The control unit 12 will have an effect on the fuel injection system 28 of the automobile 74, slowing down the speed as previously indicated.

The safety apparatus 10 (not shown in FIG. 7) may also be constructed to allow authorized transportation of weapons/ammunitions that are placed in a locked steel box in the boot of the car. This box could be connected to a device 54 as shown in FIG. 6 that would electronically be locked for the duration of the journey by the control unit 12. Once the guns are securely locked in the steel box 54 in the boot of the vehicle, the sensors 38 and the acoustical sound alarm 26 would still operate inside the cabin of the car to insure that none of the passengers is carrying an armament.

As shown in FIG. 7 in phase 3 the control unit 12 will have a distortion radio frequency 40 that will impede mobile phone communications. To allow mobile phones communications a proper hands-free kit shall be present in the car.

As shown in FIG. 7 in phase 3 the control unit 12 may interface with the external mirror on the driver's side which will have an infrared light receiver or a similar receiver to detect when another car is overtaking. In this case the control unit 12 will activate an acoustical-led 42 on the dash board 75 to alert the driver in the event he does not notice that he is being overtaken. In addition a led light 42A inserted in the mirror will alert the driver during dark.

As shown in FIG. 7 in phase 3 a sensor 52 within the wind screen/roof, will be able to detect traffic lights. The sensor 52 through the control unit 12 will transfer the information to a red light 52A placed in the center of the back windscreen highlighting a pedestrian symbol to alert the car behind of the danger. The light will blink on/off until the car moves over the traffic light.

The control unit 12 may also be adapted to limit the speed of the car to a maximum speed of 140/150 Km per hour by interfacing with the fuel injection system 28 as shown in FIG. 7.

Figure 8:
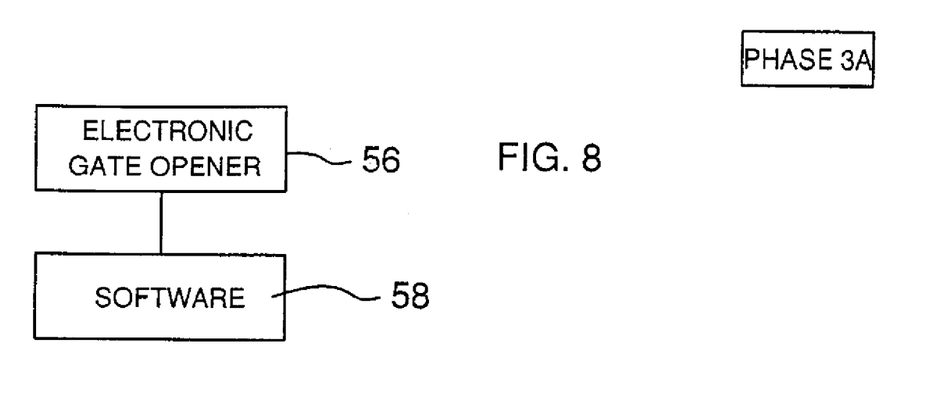
FIG. 8 is a schematic diagram illustrating implementation of a third A phase of an illustrative embodiment of the safety apparatus.

Opening of Electronic Gates as shown in FIG. 8 Phase 3A a laser 56 inside the front lights will open a gate when the headlights are flashed in front of them. The laser 56 is connected to software 58 installed inside the slot 24. The software will identify the code of the particular gate through a pre-programmed card inserted in the slot. The slot 24, will therefore operate as an anti-theft device as well as opening electronic gates. It is possible to store the codes of any different gates in the card. On flashing the lights, the laser will identify the code of that particular gate, the processor will confirm and the gate will open. The flashing of the lights will open the gate at a distance when the car is in motion.

Figure 9:
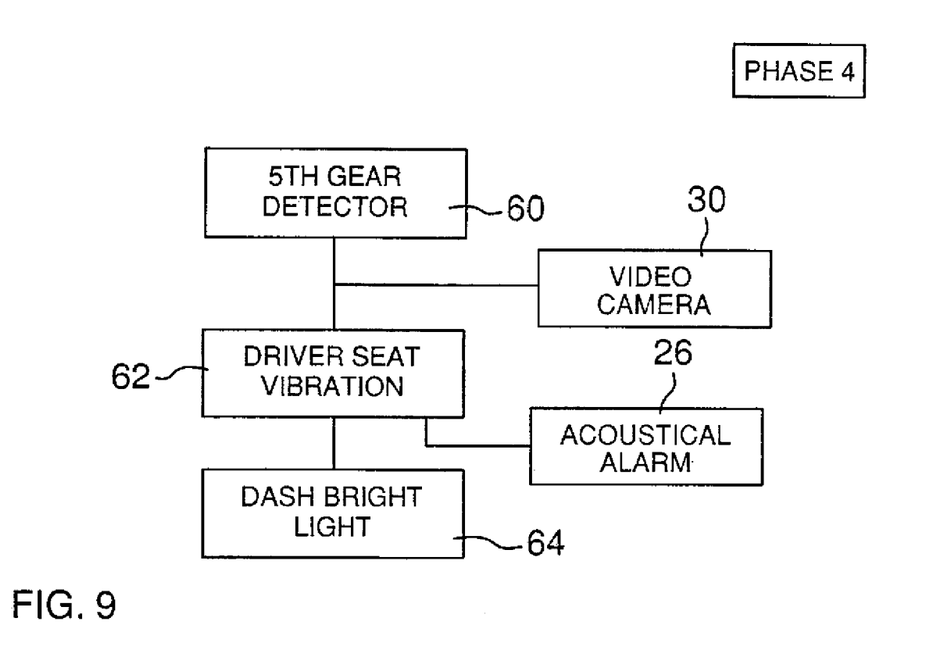
FIG. 9 is a schematic diagram illustrating implementation of a fourth phase of an illustrative embodiment of the safety apparatus.

While driving on a motorway, drivers often forget to insert the $5^{th}$ gear so that the car keeps moving on $4^{th}$ gear resulting in greater fuel consumption. To eliminate this problem a red dot 60 as shown in FIG. 9 Phase 4 placed in the center of the top of the gear stick, will communicate electrically with the gear box and will blink when the car is in $4^{th}$ gear. This will alert the driver to insert $5^{th}$ gear if appropriate, When the driver inserts $5^{th}$ gear the dot will stop blinking and will remain red until the gear is changed again.

As shown in FIG. 9 phase 4, to avoid drivers being overcome by bouts of sleepiness, the video camera 30 will detect any eye movements, the direction of the sight line, the reaction time of eyelids, the head movements of the driver through an infrared system, which will be extremely discreet and always pointed at the driver face. The software installed in the control unit 12 will analyze these parameters and will detect when driver fatigue reaches a dangerous level. At this point it will activate a vibration to the driver seat 62 as shown in FIG. 9. If the video camera 30 identifies that the dangerous condition persists, it will activate the acoustical sound 26 at a progressively increasing intensity as well as a bright display 64 as shown in FIG. 9 on the dash board 75 to alert the driver that he/she must now stop for a rest.

The control unit 12 to be construed as a 'Black Box' properly sealed with an official seal by the car manufacturer so that it can be opened in case of necessity only by the manufacturer's authorized mechanic. After the work is performed it shall be resealed. In other words all the devices must work to get the car on the road. There would be no possibility to hide or cover cameras, aroma sensor or any other device, nor to spray deodorants as the aroma sensor would only be able to detect the designated smells.

The present invention is not limited to the embodiment described herein, which may be amended or modified without departing from the scope of the present invention.

What is claimed is:

1. A safety apparatus, comprising:
    an automobile seat;
    a seat belt provided on said automobile seat;
    a plurality of detector/sensor arrangements each having a seat belt sensor connected to said seat belt and a seat occupancy detector provided in said automobile seat and connected to said seat belt sensor;
    a control unit connected to said seat belt sensor;
    an automobile ignition system connected to said control unit;
    a fuel injection system connected to said control unit;
    an anti-theft device slot connected to said control unit;
    a magnetic coded slot card adapted to interface with said anti-theft device slot;

video camera connected to said control unit and wherein said video camera is adapted to transmit an inactivation signal to said control unit and said control unit is adapted to prevent operation of said automobile ignition system when said video camera detects at least one of drugs and alcohol;

wherein said seat occupancy detector is adapted to detect an occupant in said automobile seat and transmit a signal to said seat belt sensor when said automobile seat is occupied;

wherein said seat belt sensor is adapted to detect whether said seatbelt is fastened and transmit an inactivation signal to said control unit when said seat belt is not fastened and an activation signal to said control unit when said seat belt is fastened;

wherein said control unit is adapted to prevent operation of said automobile ignition system when said seat belt sensor transmits said inactivation signal to said control unit;

wherein said control unit is adapted to reduce operation of said fuel injection system when said seat belt sensor transmits said inactivation signal to said control unit after said control unit activates said automobile ignition system;

wherein said anti-theft device slot is adapted to transmit an inactivation signal to said control unit when said magnetic coded slot card does not interface with said anti-theft device slot;

wherein said control unit is adapted to prevent operation of said automobile ignition system when said anti-theft device slot transmits said inactivation signal to said control unit;

an alcohol/drugs doping device connected to said control unit and adapted to transmit an inactivation signal to said control unit when said alcohol/drugs doping device detects at least one of drugs and alcohol;

an aroma sensor connected to said control unit and adapted to transmit an inactivation signal to said control unit when said aroma sensor detects an aroma of at least one of drugs and alcohol;

an electric gate opener having supporting software connected to said control unit;

a worn tire sensor connected to said control unit and adapted to sense wearing of an automobile tire;

an LED connected to said control unit; and wherein said control unit is adapted to activate said LED when said worn tire sensor senses wearing of the automobile tire.

2. The safety apparatus of claim 1 further comprising an acoustic alarm connected to said control unit and wherein said control unit is adapted to activate said acoustic alarm when said seat belt sensor transmits said inactivation signal to said control unit.

3. The safety apparatus of claim 1 further comprising a light emitter connected to said control unit and wherein said control unit is adapted to activate said light emitter when said seat belt sensor transmits said activation signal to said control unit.

4. The safety apparatus of claim 1 further comprising a weapons/ammunition detector connected to said control unit and wherein said weapons/ammunition detector is adapted to transmit an inactivation signal to said control unit and said control unit is adapted to prevent operation of said automobile ignition system when said weapons/ammunition detector detects at least one of weapons and ammunition.

* * * * *